United States Patent
Chu et al.

(10) Patent No.: US 11,457,399 B2
(45) Date of Patent: Sep. 27, 2022

(54) SELECTION OF TRANSMISSION MODES IN DENSE WIRELESS NETWORKS

(71) Applicant: Marvell Asia Pte Ltd, Singapore (SG)

(72) Inventors: Liwen Chu, San Ramon, CA (US);
Ken Kinwah Ho, San Jose, CA (US);
Jinjing Jiang, San Jose, CA (US);
Hongyuan Zhang, Fremont, CA (US);
Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 15/865,871

(22) Filed: Jan. 9, 2018

(65) Prior Publication Data
US 2018/0199272 A1  Jul. 12, 2018

Related U.S. Application Data

(60) Provisional application No. 62/443,944, filed on Jan. 9, 2017.

(51) Int. Cl.
*H04W 48/12* (2009.01)
*H04B 7/08* (2006.01)
(Continued)

(52) U.S. Cl.
CPC .......... *H04W 48/12* (2013.01); *H04B 7/0817* (2013.01); *H04L 1/0083* (2013.01);
(Continued)

(58) Field of Classification Search
CPC ... H04B 7/0817; H04B 7/0413; H04L 1/0083; H04L 1/08; H04W 72/0453;
(Continued)

(56) References Cited

U.S. PATENT DOCUMENTS

2007/0010237 A1 * 1/2007 Jones .................... H04W 88/10
                                                          455/422.1
2013/0259017 A1   10/2013 Zhang et al.
(Continued)

FOREIGN PATENT DOCUMENTS

CN         102318206 A       1/2012
EP         3258636 A1 * 12/2017  ........... H04L 1/0001
(Continued)

OTHER PUBLICATIONS

IEEE P802.11-REVmcTM/D3.0, Jun. 2014 "Part 11: Wireless LAN Medium Access Control (MAC) and Physical Layer (PHY) Specifications" (Year: 2014).*
(Continued)

Primary Examiner — Yemane Mesfin
Assistant Examiner — Intekhaab A Siddiquee

(57) ABSTRACT

In a wireless communication network that operates according to a communication protocol that defines one or more first transmission modes that provide extended range communications as compared to one or second transmission modes defined by the communication protocol, a communication device generates a communication frame that includes information indicating that the one or more first transmission modes should not be used when transmitting in the wireless communication network. The communication device transmits the communication frame to instruct one or more other communication devices in the wireless communication network to not use the one or more first transmission modes when transmitting in the wireless communication network.

16 Claims, 3 Drawing Sheets

(51) Int. Cl.
  *H04W 72/04* (2009.01)
  *H04W 72/12* (2009.01)
  *H04B 7/0413* (2017.01)
  *H04L 1/00* (2006.01)
  *H04L 1/08* (2006.01)
  *H04W 84/12* (2009.01)
  *H01Q 5/10* (2015.01)

(52) U.S. Cl.
  CPC ............ *H04L 1/08* (2013.01); *H04W 72/0453* (2013.01); *H04W 72/1278* (2013.01); *H01Q 5/10* (2015.01); *H04B 7/0413* (2013.01); *H04W 84/12* (2013.01)

(58) Field of Classification Search
  CPC . H04W 72/1278; H04W 84/12; H04W 48/12; H01Q 5/10
  USPC ......................................................... 370/252
  See application file for complete search history.

(56) References Cited

U.S. PATENT DOCUMENTS

| | | | |
|---|---|---|---|
| 2013/0315264 A1* | 11/2013 | Srinivasa | H04L 5/00 370/474 |
| 2015/0117433 A1 | 4/2015 | Zhang et al. | |
| 2017/0142659 A1* | 5/2017 | Noh | H04W 52/0245 |
| 2017/0181136 A1* | 6/2017 | Bharadwaj | H04W 72/0453 |
| 2017/0289819 A1* | 10/2017 | Kim | H04W 74/0808 |
| 2018/0048450 A1* | 2/2018 | Raissinia | H04L 1/0003 |
| 2018/0184365 A1* | 6/2018 | Gidvani | H04W 24/02 |
| 2018/0220368 A1* | 8/2018 | Gidvani | H04W 74/006 |

FOREIGN PATENT DOCUMENTS

| | | |
|---|---|---|
| JP | 2009500945 A | 1/2009 |
| JP | 2016536871 A | 11/2016 |
| KR | 10-2008-0069569 A | 7/2008 |
| KR | 10-2016-0077134 A | 7/2016 |
| WO | 2007005319 A2 | 1/2007 |
| WO | 2015061729 A1 | 4/2015 |

OTHER PUBLICATIONS

Part 11: Wireless LAN Medium Access Control (MAC) and Physical Layer (PHY) Specifications (IEEE P802.11-REVmc™/D3.0, Jun. 2014) (Year: 2014).*
U.S. Appl. No. 62/438,342, filed Dec. 22, 2016 (Year: 2016).*
U.S. Appl. No. 62/453,768P (provisional application) (Year: 2017).*
U.S. Appl. No. 62/314,971_specification_2017-3-07.pdf (Year: 2016).*
IEEE Std 802.11-REVmc™/D8.0 (revision of IEEE Std. 802.11™—2012) "Draft Standard for Information technology—Telecommunications and information exchange between systems—Local and metropolitan area networks—Specific requirements" Part 11: Wireless LAN Medium Access Control (MAC) and Physical Layer (PHY) Specifications, The Institute of Electrical and Electronics Engineers, Inc., 3774 pages (Aug. 2016).
IEEE P802.11ax™/D1.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Nov. 2016).
IEEE P802.11ax™/D1.4, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 6: Enhancements for High Efficiency WLAN," IEEE Computer Society, 453 pages (Aug. 2017).
International Search Report and Written Opinion in International Patent Application No. PCT/US2018/012886, dated Jun. 13, 2018 (12 pages).
Aboul-Magd, "IEEE 802.11ax Overview," IEEE draft doc IEEE 802.19-16/0127r0, dated Jul. 20, 2016 (20 pages).
International Preliminary Report on Patentability in International Patent Application No. PCT/US2018/012886, dated Jul. 18, 2019 (8 pages).
Notice of Reasons for Rejection for Japanese Application No. 2019-537229 dated Dec. 20, 2021. (10 pages).
Sugigaki et al., "A Packet Scheduling Scheme Using Multicast RTS in Wireless Mesh Networks," Inst. of Electrical Engineers of Japan, vol. 133, No. 2, pp. 275-282, Feb. 1, 2013.
Venkateswaran et al., "IEEE P802 11—Wireless LANs—Comment Resolution on DCM TBDs," doc. No. IEEE 802 11-16/XXXr0, Broadcom, Jul. 13, 2016.
Search Report in Chinese Patent Application No. 201880016736.4, mailed with Office Action dated Oct. 11, 2021 (2 pages).
Office Action in Chinese Patent Application No. 201880016736.4, dated Oct. 11, 2021, with English translation (5 pages).
Korean Application No. 10-2019-7023012 Office Action, dated May 25, 2022 (13 pages).
Venkateswaran et al., "Comment Resolutions on DCM TBDs," doc.: IEEE 802.11-16/0923r1, Jul. 13, 2016, (5 pages) available at https://mentor.ieee.org/802.11/dcn/16/11-16-0923-01-00ax-phy-cr-dcm constellation-mapping.docx.

* cited by examiner

Generate a communication frame that includes information indicating that one or more first transmission modes should not be used when transmitting in a wireless communication network, where the one or more first transmission modes provide extended range communications as compared to one or second transmission modes 304

Transmit the communication frame to instruct one or more other communication devices in the wireless communication network to not use the one or more first transmission modes 308

Receive a communication frame that includes information indicating that one or more first transmission modes should not be used when transmitting in the wireless communication network, where the one or more first transmission modes provide extended range communications as compared to one or second transmission modes 404

In response to receiving the communication frame, refrain from using the one or more first transmission modes when transmitting in the wireless communication network 408

SELECTION OF TRANSMISSION MODES IN DENSE WIRELESS NETWORKS

CROSS REFERENCES TO RELATED APPLICATIONS

This application claims the benefit of U.S. Provisional Patent Application No. 62/443,944, entitled "HE Multirate Selection and 2G4 40 MHZ HE Devices," filed on Jan. 9, 2017, which is hereby incorporated herein by reference in its entirety.

FIELD OF TECHNOLOGY

The present disclosure relates generally to wireless communication systems, and more particularly to selection of transmission modes in a wireless communication network.

BACKGROUND

Wireless local area networks (WLANs) have evolved rapidly over the past decade, and development of WLAN standards such as the Institute for Electrical and Electronics Engineers (IEEE) 802.11 Standard family has improved single-user peak data throughput. For example, the IEEE 802.11b Standard specifies a single-user peak throughput of 11 megabits per second (Mbps), the IEEE 802.11a and 802.11g Standards specify a single-user peak throughput of 54 Mbps, the IEEE 802.11n Standard specifies a single-user peak throughput of 600 Mbps, and the IEEE 802.11ac Standard specifies a single-user peak throughput in the gigabits per second (Gbps) range. Future standards promise to provide even greater throughput, such as throughputs in the tens of Gbps range.

SUMMARY

In an embodiment, a method is implemented in a wireless communication network that operates according to a communication protocol that defines one or more first transmission modes that provide extended range communications as compared to one or second transmission modes defined by the communication protocol. The method includes: generating, at a communication device, a communication frame that includes information indicating that the one or more first transmission modes should not be used when transmitting in the wireless communication network; and transmitting, by the communication device, the communication frame to instruct one or more other communication devices in the wireless communication network to not use the one or more first transmission modes when transmitting in the wireless communication network.

In other embodiments, the method further includes one of, or any suitable combination of two or more of, the following features.

The communication protocol defines a plurality of physical layer (PHY) protocol data unit (PPDU) formats including an extended range PPDU format for providing extended range communications; and the one or more first transmission modes comprise the extended range PPDU format.

The communication protocol defines a dual carrier modulation (DCM) mode; and the one or more first transmission modes comprise a dual carrier modulation (DCM) mode.

The communication protocol defines a plurality of modulation and coding schemes (MCSs) corresponding to different data rates; and the one or more first transmission modes comprise one or more first MCSs that i) correspond to one or more lower data rates, and ii) facilitate longer range communications, as compared to one or more second MCSs in the plurality of MCSs.

The communication protocol i) defines a plurality of modulation and coding schemes (MCSs), and ii) permits the use of different numbers of spatial streams; and the one or more first transmission modes comprise one or more sets of MCS/number of spatial stream combinations, wherein one or more first MCSs in the MCS/number of spatial stream combinations of the one or more first transmission modes correspond to i) to one or more lower data rates, and ii) facilitate longer range communications, as compared to one or more second MCSs in the plurality of MCSs, for a given number of spatial streams.

The information indicating that the one or more first transmission modes should not be used when transmitting in the communication network indicates that the one or more first transmission modes should not be used when transmitting at least some media access control layer (MAC) control frames and/or MAC management frames in the communication network.

The information indicating that the one or more first transmission modes should not be used when transmitting in the communication network indicates that the one or more first transmission modes should not be used when transmitting data frames in the communication network.

The communication frame is a media access control layer (MAC) protocol data unit; the method further comprise generating, at the communication device, a physical layer (PHY) protocol data unit PPDU that includes the MAC protocol data unit; and transmitting the communication frame includes transmitting the PPDU.

The one or more first transmission modes include one or more first physical layer (PHY) protocol transmission modes; and the one or more second transmission modes include one or more second PHY protocol transmission modes.

In another embodiment, an apparatus comprises: a network interface device associated with a communication device. The network interface device includes one or more integrated circuits (ICs) configured to: generate a communication frame that includes information indicating that one or more first transmission modes should not be used when transmitting in a wireless communication network, wherein the wireless communication network operates according to a communication protocol that defines the one or more first transmission modes and one or second transmission modes, wherein the one or more first transmission modes provide extended range communications as compared to the one or second transmission modes; wherein the one or more ICs are further configured to transmit the communication frame to instruct one or more other communication devices in the wireless communication network to not use the one or more first transmission modes when transmitting in the wireless communication network.

In other various embodiments, the apparatus further comprises one of, or any suitable combination of two or more of, the following features.

The communication protocol defines a plurality of physical layer (PHY) protocol data unit (PPDU) formats including an extended range PPDU format for providing extended range communications; and the one or more first transmission modes comprise the extended range PPDU format.

The communication protocol defines a dual carrier modulation (DCM) mode; and the one or more first transmission modes comprise a dual carrier modulation (DCM) mode.

The communication protocol defines a plurality of modulation and coding schemes (MCSs) corresponding to different data rates; and the one or more first transmission modes comprise one or more first MCSs that i) correspond to one or more lower data rates, and ii) facilitate longer range communications, as compared to one or more second MCSs in the plurality of MCSs.

The communication protocol i) defines a plurality of modulation and coding schemes (MCSs), and ii) permits the use of different numbers of spatial streams; and the one or more first transmission modes comprise one or more sets of MCS/number of spatial stream combinations, wherein one or more first MCSs in the MCS/number of spatial stream combinations of the one or more first transmission modes correspond to i) to one or more lower data rates, and ii) facilitate longer range communications, as compared to one or more second MCSs in the plurality of MCSs, for a given number of spatial streams.

The information indicating that the one or more first transmission modes should not be used when transmitting in the communication network indicates that the one or more first transmission modes should not be used when transmitting at least some media access control layer (MAC) control frames and/or MAC management frames in the communication network.

The information indicating that the one or more first transmission modes should not be used when transmitting in the communication network indicates that the one or more first transmission modes should not be used when transmitting data frames in the communication network.

The communication frame is a media access control layer (MAC) protocol data unit; and the one or more ICs are further configured to: generate a physical layer (PHY) protocol data unit PPDU that includes the MAC protocol data unit, and transmit the PPDU.

The one or more first transmission modes include one or more first physical layer (PHY) protocol transmission modes; and the one or more second transmission modes include one or more second PHY protocol transmission modes.

The network interface device comprises: a physical layer (PHY) processor implemented on the one or more IC devices; and a medium access control (MAC) processor coupled to the PHY processor and implemented on the one or more IC devices.

The PHY processor comprises: one or more transceivers.

The apparatus further comprises: one or more antennas coupled to the one or more transceivers.

BRIEF DESCRIPTION OF THE DRAWINGS

FIG. 3 is a flow diagram of an example method for instructing one or more communication devices in a wireless communication network to not use one or more transmission modes defined by a communication protocol in order to limit range of transmissions in the wireless communication network, according to an embodiment.

FIG. 4 is a flow diagram of an example method for communicating in a wireless communication network in response to receiving an instruction to not use one or more transmission modes defined by a communication protocol, according to an embodiment.

DETAILED DESCRIPTION

In embodiments described below, transmission modes (physical layer (PHY) protocol transmission modes) are selected to improve spatial reuse in dense wireless networks. For example, in some embodiments, a first communication device (e.g., an access point) in a wireless network instructs one or more second communication devices (e.g., client stations) in the wireless network that certain transmission modes that provide extended range should not be used. In other embodiments, rules for using transmission modes that provide extended range are defined so that such transmission modes are used only in certain circumstances. By limiting the uses of such transmission modes, the range of transmissions by communication devices in the wireless network are generally reduced, thus facilitating spatial reuse of a communication channel by other nearby communication networks.

Figure 1:
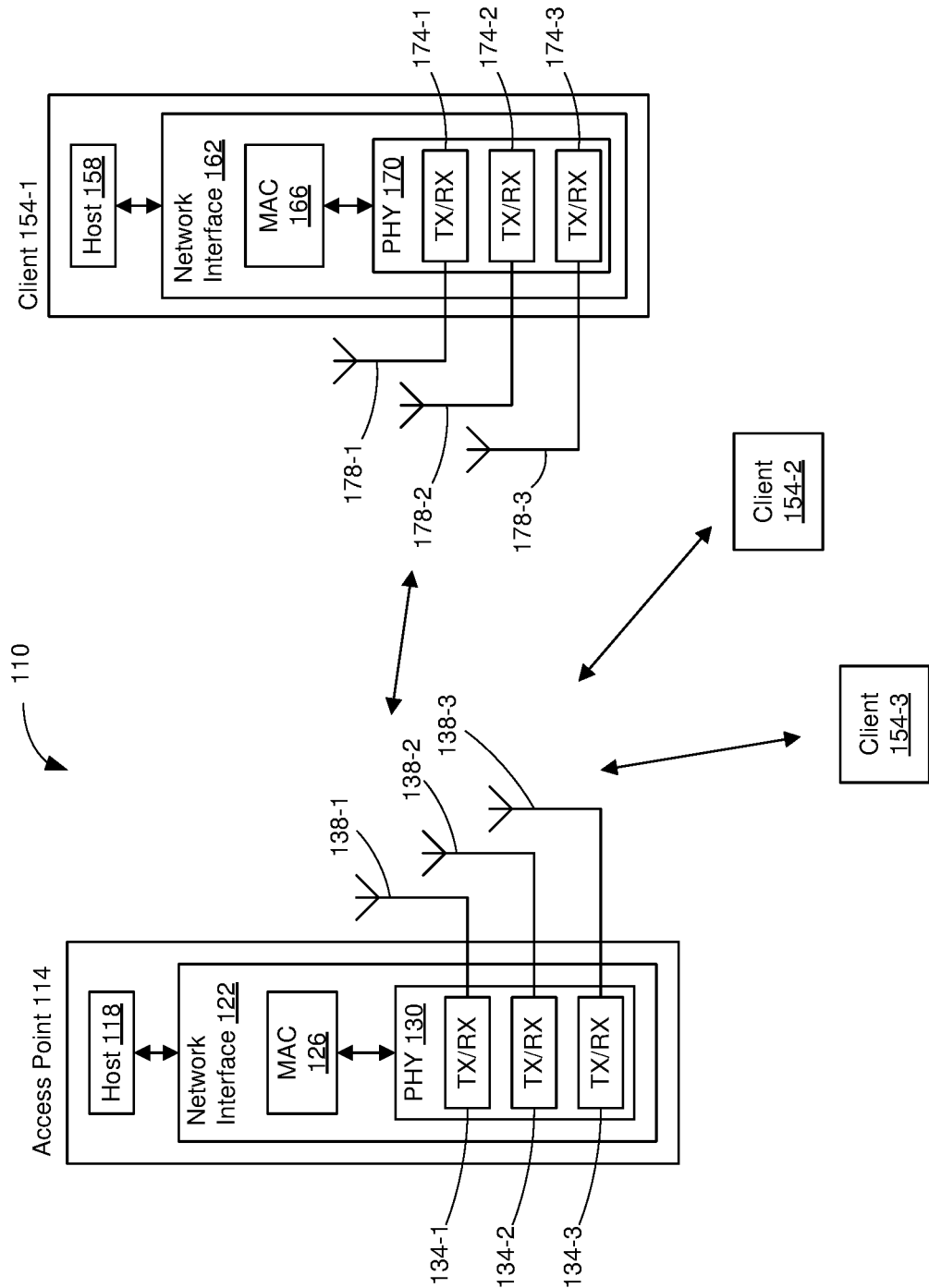
FIG. 1 is a block diagram of an example wireless local area network (WLANs), according to an embodiment.

FIG. 1 is a block diagram of an example wireless local area network (WLAN) 110 that uses one or more transmission mode selection techniques such as described below, according to an embodiment. The WLAN 110 includes an access point (AP) 114 that comprises a host processor 118 coupled to a network interface device 122. The network interface 122 includes a medium access control (MAC) processor 126 and a physical layer (PHY) processor 130. The PHY processor 130 includes a plurality of transceivers 134, and the transceivers 134 are coupled to a plurality of antennas 138. Although three transceivers 134 and three antennas 138 are illustrated in FIG. 1, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

The network interface 122 is implemented using one or more integrate circuits (ICs) configured to operate as discussed below. For example, the MAC processor 126 may be implemented, at least partially, on a first IC, and the PHY processor 130 may be implemented, at least partially, on a second IC. As another example, at least a portion of the MAC processor 126 and at least a portion of the PHY processor 130 may be implemented on a single IC. For instance, the network interface 122 may be implemented using a system on a chip (SoC), where the SoC includes at least a portion of the MAC processor 126 and at least a portion of the PHY processor 130. In some embodiments, the MAC processor 126 includes a controller (e.g., one or more of a hardware state machine, a processor that executes machine readable instructions stored in a memory included in, or coupled to, the MAC processor 126, etc.).

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

The WLAN 110 includes a plurality of client stations 154. Although three client stations 154 are illustrated in FIG. 1, the WLAN 110 includes other suitable numbers (e.g., 1, 2, 4, 5, 6, etc.) of client stations 154 in various embodiments. The client station 154-1 includes a host processor 158 coupled to a network interface device 162. The network interface 162 includes a MAC processor 166 and a PHY processor 170. The PHY processor 170 includes a plurality of transceivers 174, and the transceivers 174 are coupled to a plurality of antennas 178. Although three transceivers 174 and three antennas 178 are illustrated in FIG. 1, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

The network interface 162 is implemented using one or more ICs configured to operate as discussed below. For example, the MAC processor 166 may be implemented on at least a first IC, and the PHY processor 170 may be implemented on at least a second IC. As another example, at least a portion of the MAC processor 166 and at least a portion of the PHY processor 170 may be implemented on a single IC. For instance, the network interface 162 may be implemented using an SoC, where the SoC includes at least a portion of the MAC processor 166 and at least a portion of the PHY processor 170. In some embodiments, the MAC processor 166 includes a controller (e.g., one or more of a hardware state machine, a processor that executes machine readable instructions stored in a memory included in, or coupled to, the MAC processor 166, etc.).

In various embodiments, the MAC processor 166 and the PHY processor 170 of the client device 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

In an embodiment, each of the client stations 154-2 and 154-3 has a structure that is the same as or similar to the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

In an embodiment, the WLAN communication protocol defines a plurality of modulation and coding schemes (MCSs) that can be utilized for a PPDU. Generally, each MCS corresponds to i) a particular modulation scheme, and ii) a particular coding rate (corresponding to a forward error correction code (FEC) scheme), and each MCS corresponds to a different effective data rate. For example, less complex modulation schemes (e.g., binary phase shift keying (BPSK), quaternary phase shift keying (QPSK)) provide more robust transmission reliability but provide a lower data rate as compared to more complex modulations schemes (e.g., 16 constellation point quaternary amplitude modulation (16-QAM), 64-QAM, 256-QAM, etc.). Similarly, lower coding rates (e.g., 1/2) for FEC provide more robust transmission reliability but provide a lower data rate as compared to higher coding rates (e.g., 3/4, 5/6, etc.). A coding rate indicates a ratio of information bits to a total number of bits transmitted, including redundant FEC bits. Thus, the lower coding rates generally correspond to adding more redundant FEC bits as compared to higher coding rates.

In an embodiment, the communication protocol defines an MCS index that communication devices can use to indicate which MCS is used for a particular transmission, where the effective data rate increases as the index value increases. Table 1 is an example listing of MCS index values, with the corresponding modulation schemes and coding rates, according to an embodiment. In other embodiments, one or more other suitable modulation scheme/coding rate combinations are used instead of, or in addition to, the example modulation scheme/coding rate combinations listed in Table 1.

TABLE 1

| MCS Index | Modulation Scheme | Coding Rate |
|---|---|---|
| 0 | BPSK | 1/2 |
| 1 | QPSK | 1/2 |
| 2 | QPSK | 3/4 |
| 3 | 16-QAM | 1/2 |
| 4 | 16-QAM | 3/4 |
| 5 | 64-QAM | 2/3 |
| 6 | 64-QAM | 3/4 |
| 7 | 64-QAM | 5/6 |
| 8 | 256-QAM | 3/4 |
| 9 | 256-QAM | 5/6 |

In some embodiments, the wireless communication protocol provides for transmission via multiple spatial streams. An MCS used with multiple spatial streams generally provides a higher effective data rate as compared using the same MCS with a single spatial stream. On the other hand, for a given number of spatial streams, the effective data rate increases as the MCS index value increases.

In some embodiments, the wireless communication protocol provides for use of different channel frequency bandwidths (e.g., 20 MHz, 40 MHz, 80 MHz, etc.). Transmit power of a transmission at a wider frequency bandwidth is spread across the wider frequency bandwidth, and thus the range of the transmission tends to be shorter as compared to a transmission at a narrower bandwidth. Thus, in some embodiments, a transmission at first frequency bandwidth using a particular MCS will have a longer range as compared to a transmission using the particular MCS at a second frequency bandwidth that is wider than the first frequency bandwidth.

PPDUs transmitted using MCSs corresponding to lower index values (e.g., MCS index=0 (MCS0), MCS1) can be successfully decoded at longer distances as compared to PPDUs transmitted using MCSs corresponding to higher index values (e.g., MCS4-MCS9), at least for a given number of spatial streams and a given frequency bandwidth. Thus, using the lower MCSs, at least for a given number of spatial streams and a given frequency bandwidth, effectively increases the transmission range of a PPDU, which may interfere with transmissions in, and/or consume wireless medium time of, neighboring wireless communication networks.

In some embodiments, certain MCSs are defined as mandatory by the wireless communication protocol, i.e., devices conforming to the wireless communication protocol must support the mandatory MCSs. In some embodiments, certain MCSs for a single spatial stream are defined as mandatory by the wireless communication protocol, i.e., devices conforming to the wireless communication protocol must support the mandatory MCSs for a single spatial stream.

In some embodiments, the wireless communication protocol optionally permits use of a dual carrier modulation (DCM) technique, which involves transmitting the same data at different frequencies, thus providing frequency diversity. In some embodiments, the communication protocol specifies that DCM is permitted for only a subset of MCSs defined by the communication protocol. For example, DCM is only permitted to be used with MCS0, MCS1, MCS3, and MCS4 (Table 1), according to an illustrative embodiment. PPDUs transmitted using DCM can be successfully decoded at longer distances as compared to PPDUs transmitted without using DCM. Thus, using DCM effectively increases the transmission range of a PPDU, which may interfere with transmissions in, and/or consume wireless medium time of, neighboring wireless communication networks.

Figure 2A:
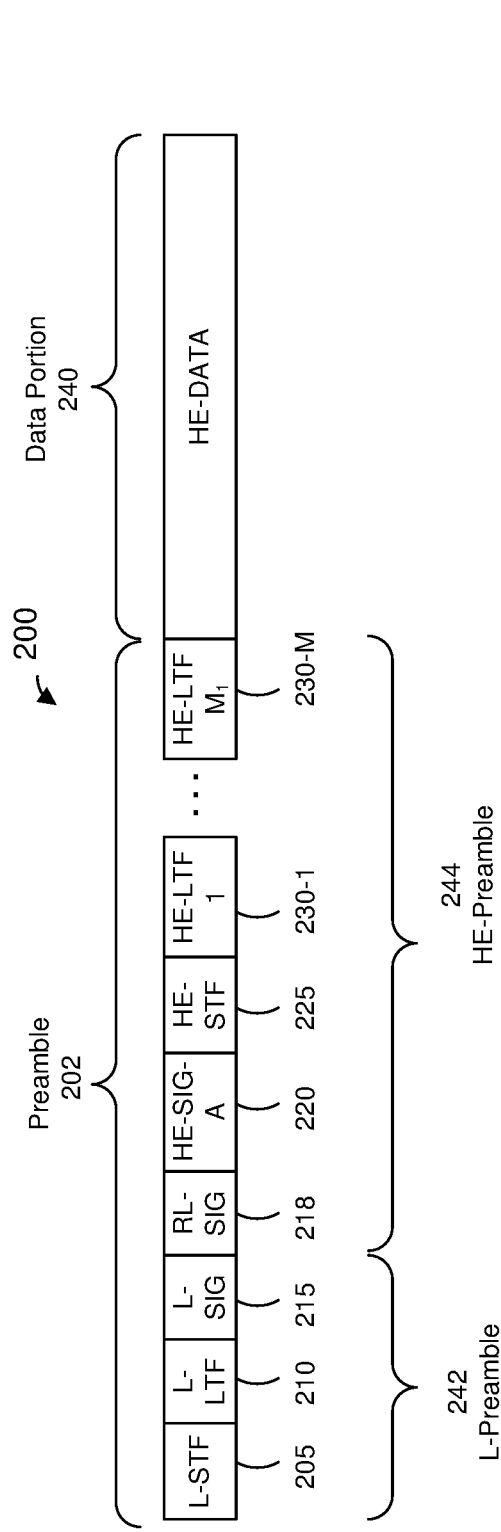
FIG. 2A is a block diagram of an example single-user physical layer (PHY) data unit, according to an embodiment.

FIG. 2A is a diagram of a single-user physical layer (PHY) protocol data unit (PPDU) 200 that the network interface 122 (FIG. 1) is configured to generate and transmit to one client station 154 (e.g., the client station 154-1), according to an embodiment. The network interface 162 (FIG. 1) may also be configured to transmit data units the same as or similar to the data unit 200 to the AP 114. The PPDU 200 may occupy a 20 MHz bandwidth or another suitable bandwidth. PHY protocol data units similar to the PPDU 200 occupy other suitable bandwidth such as 40 MHz, 80 MHz, 160 MHz, 320 MHz, 640 MHz, for example, or other suitable bandwidths, in other embodiments.

The PPDU 200 includes a preamble 202 including a legacy short training field (L-STF) 205, a legacy long training field (L-LTF) 210, a legacy signal field (L-SIG) 215, a repeated L-SIG field (RL-SIG) 218, a high efficiency (HE) signal field (HE-SIG-A) 220, an HE short training field (HE-STF) 225, and M HE long training fields (HE-LTFs) 230, where M is a suitable positive integer. In an embodiment, M generally corresponds to (e.g., is greater than or equal to) a number of spatial streams via which the data unit 200 will be transmitted. A legacy preamble portion 242 of the preamble 202 includes the L-STF 205, L-LTF 210 and L-SIG 215. An HE preamble portion 244 of the preamble 202 includes the RL-SIG 218, the HE-SIG-A 220, the HE-STF 225 and the M HE-LTFs 230. The data unit 200 also includes a data portion 240. In some scenarios, the PPDU 200 may omit the data portion 240.

The L-STF 205 generally includes information that is useful for packet detection and synchronization, whereas the L-LTF 210 generally includes information that is useful for channel estimation and fine synchronization. The L-SIG 215 generally signals PHY parameters to the receiving devices, including legacy devices, such as a length of the PPDU 200.

The HE-STF 225 generally includes information that is useful for improving automatic gain control estimation in a MIMO transmission. The HE-LTFs 230 generally includes information that is useful for estimating a MIMO channel.

In some embodiments, the preamble 202 omits one or more of the fields 205-230. In some embodiments, the preamble 202 includes additional fields not illustrated in FIG. 2A.

Each of the L-STF 205, the L-LTF 210, the L-SIG 215, the RL-SIG 218, the HE-SIG-A 220, the HE-STF 225, and the M HE-LTFs 230 comprises one or more OFDM symbols. As merely an illustrative example, the HE-SIG-A 220 comprises two OFDM symbols.

In the illustration of FIG. 2A, the PPDU 200 includes one of each of the L-STF 205, the L-LTF 210, the L-SIG 215, the RL-SIG 218 and the HE-SIG-A 220. In some embodiments in which a data unit similar to the data unit 200 occupies a cumulative bandwidth other than 20 MHz, each of the L-STF 205, the L-LTF 210, the L-SIG 215, the RL-SIG 218, and the HE-SIG-A 220 is repeated over a corresponding number of 20 MHz sub-bands of the whole bandwidth of the data unit, in an embodiment. For example, in an embodiment in which the data unit occupies an 80 MHz bandwidth, the PPDU 200 includes four of each of the L-STF 205, the L-LTF 210, the L-SIG 215, the RL-SIG 218, and the HE-SIG-A 220 in respective 20 MHz sub-bands.

In an embodiment, the HE-SIG-A 220 generally carries information about the format of the PPDU 200, such as information needed to properly decode at least a portion of the PPDU 200, in an embodiment. In some embodiments, HE-SIG-A 220 additionally includes information for receivers that are not intended receivers of the PPDU 200, such as information needed for medium protection, spatial reuse, etc.

In some embodiments, a format similar to the format in FIG. 2A is defined for an extended range SU PPDU, where a duration of an HE-SIG-A field is twice the duration of the HE-SIG-A 220. For example, in an embodiment, information in the HE-SIG-A field 220 is included twice so that the duration of the HE-SIG-A field in the extended range SU PPDU is twice the duration of the HE-SIG-A 220.

Additionally, for an extended range SU PPDU, transmit power is boosted for certain fields (and/or certain OFDM tones of certain fields) of the preamble 202 as compared to a transmit power of other fields/portions of the extended range SU PPDU, such as the data portion 240, according to some embodiments. For example, a transmit power boost of 3 decibels (dB) is applied to one of, or any suitable combination of two or more of, L-STF 205, L-LTF 210, HE-STF 225, and/or HE-LTF(s) 230, as compared to a transmit power of other fields/portions of the extended range SU PPDU, such as the data portion 240, according to some embodiments. Such a transmit power boost to fields such as L-STF 205, L-LTF 210, HE-STF 225, and/or HE-LTF(s) 230, help to improve packet detection, synchronization, channel estimation, etc., for communication devices separated by greater distances.

On the other hand, such a transmit power boost to fields such as L-STF 205, L-LTF 210, HE-STF 225, and/or HE- LTF(s) 230, effectively increases the transmission range of the extended range SU PPDU, which may interfere with transmissions in, and/or consume wireless medium time of, neighboring wireless communication networks.

In some embodiments, the wireless communication protocol restricts the MCSs that can be used for extended range SU PPDUs to MCSs of lower indices. For example, the wireless communication protocol specifies that only MCS0, MCS1, or MCS2 can be used for an extended range SU PPDU, according to an illustrative embodiment. Thus, for this additional reason, the transmission range of extended range SU PPDUs is extended (as compared to a PPDU that uses an MCS higher than MCS2), which may interfere with transmissions in, and/or consume wireless medium time of, neighboring wireless communication networks.

Figure 2B:
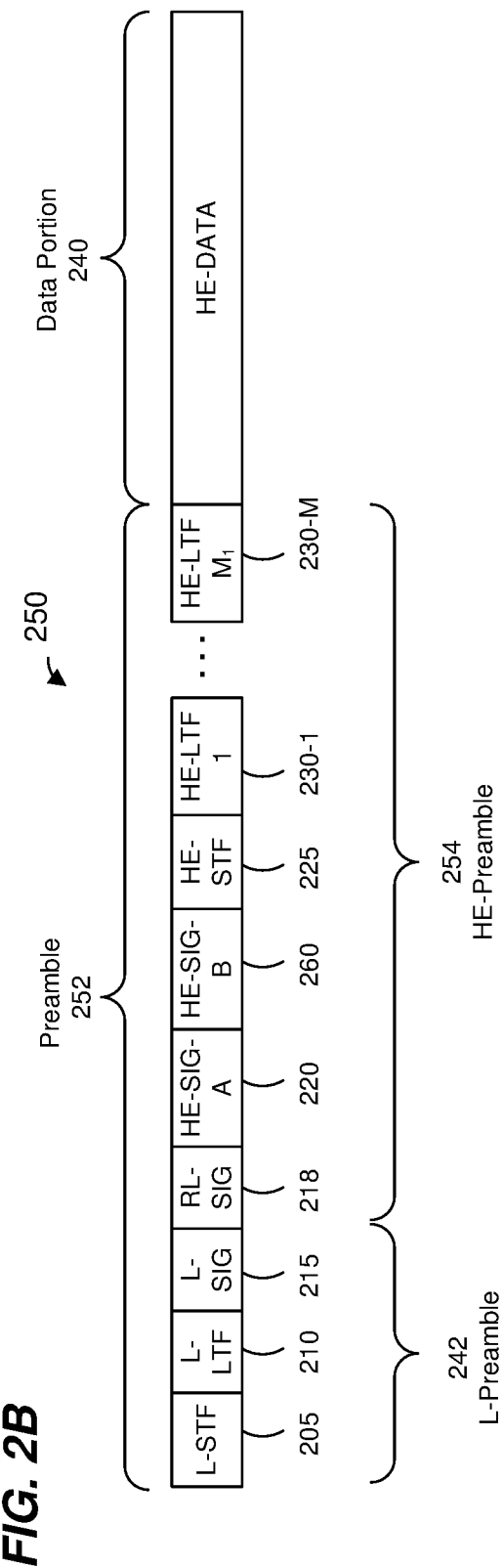
FIG. 2B is a block diagram of an example multi-user PHY data unit, according to an embodiment.

FIG. 2B is a diagram of a multi-user PPDU 250 that the network interface 122 (FIG. 1) is configured to transmit to multiple client stations 154, according to an embodiment. The network interface 162 (FIG. 1) may also be configured to generate and transmit data units the same as or similar to the PPDU 250. The PPDU 250 may occupy a 20 MHz bandwidth or another suitable bandwidth. PPDUs similar to the PPDU 250 occupy other suitable bandwidth such as 40 MHz, 80 MHz, 160 MHz, 320 MHz, 640 MHz, for example, or other suitable bandwidths, in other embodiments.

In an embodiment, the PPDU 250 is a downlink (DL) orthogonal frequency division multiple access (OFDMA) unit in which independent data streams are transmitted to multiple client stations 154 using respective sets of OFDM tones and, in some cases respective spatial streams, allocated to the client stations 154. For example, in an embodiment, available OFDM tones (e.g., OFDM tones that are not used as DC tone and/or guard tones) are segmented into multiple resource units (RUs), and each of the multiple RUs is allocated to transmissions to one or more client stations 154. The PPDU 250 is similar to the PPDU 200 of FIG. 2A, and like-numbered elements are not described again in detail for purposes of brevity.

The PPDU 250 includes a preamble 252 similar to the preamble 202 (FIG. 2A). The preamble 262 includes an HE portion 254 similar to the HE portion 244 (FIG. 2A). The HE portion 254 includes an HE signal field (HE-SIG-B) 260.

In an embodiment in which a PPDU similar to the PPDU 250 occupies a cumulative bandwidth other than 20 MHz, the HE-SIG-B 260 is repeated over a corresponding number of 20 MHz sub-bands of the whole bandwidth of the data unit. In another embodiment in which a data unit similar to the PPDU 250 occupies a cumulative bandwidth other than 20 MHz, the HE-SIG-B 260 includes different channel-specific portions corresponding to different 20 MHz sub-bands of the whole bandwidth of the data unit, and the different channel specific portions are transmitted in parallel in the corresponding 20 MHz sub-bands of the whole bandwidth of the PPDU 250.

The HE-SIG-A 220 and the HE-SIG-B 260 generally carry information about the format of the PPDU 250, such as information needed to properly decode at least a portion of the PPDU 250, in an embodiment. The HE-SIG-A 220 carries information commonly needed by multiple intended receivers of the PPDU 250. On the other hand, the HE-SIG-B 260 carries user-specific information individually needed by each intended receiver of the PPDU 250. In an embodiment, HE-SIG-A 220 includes information needed to properly decode HE-SIG-B 260, and HE-SIG-B 260 includes information needed to properly decode data streams in the data portion 240 of the PPDU 250.

As is described in more detail below, the use of one or more transmission modes (e.g., MCSs, DCM, extended range SU PPDUs, etc.) that result in longer range transmissions are restricted in a wireless communication network when the wireless communication network is operating in a dense environment (e.g., there are multiple neighboring wireless communication networks) and/or to facilitate spatial reuse of a wireless communication medium by one or more neighboring wireless communication networks, according to some embodiments.

A MAC control frame (e.g., a request to send (RTS) frame, a multi-user RTS (MU-RTS) frame, a block acknowledgement request (BlockAckReq) frame, etc.) that prompts a response frame is included in a data portion of an MU PPDU the same as or similar to the PPDU 200 and/or the PPDU 250, according to an embodiment. Rules for using one or more transmission modes (e.g., MCSs, DCM, extended range SU PPDUs, etc.) that result in longer range transmissions for control frames and/or response frames, according to some embodiments, are described in more detail below. Such rules restrict the use of the one or more transmission modes for control/response frames to facilitate spatial reuse of a wireless communication medium by one or more neighboring wireless communication networks, according to some embodiments.

In some embodiments, a communication device in a wireless communication network (e.g., an AP of the wireless communication network) determines that one or more transmission modes defined by the wireless communication protocol that provide longer transmission ranges (e.g., as compared to other transmission modes defined by the wireless communication protocol) should not be used in the wireless communication network in order to reduce the range of transmissions of the wireless communication network. For example, the communication device (e.g., the AP) may detect transmissions from one or more other neighboring wireless communication networks and, based on such detection, determine that that the one or more transmission modes that provide longer transmission ranges should not be used in the wireless communication network. As another example, the communication device (e.g., the AP) may receive one or more communications from one or more other communication devices (e.g., one or more other APs) in one or more other wireless communication networks, where the one or more communications indicate that transmissions in the wireless network are interfering with transmissions of, and/or consuming wireless medium time of, the one or more other wireless communication networks. In response to such communications, the communication device may determine that that the one or more transmission modes that provide longer transmission ranges should not be used in the wireless communication network. As yet another example, the communication device (e.g., the AP) may receive one or more communications from another communication device (e.g., a controller communicatively coupled to the AP and/or one or more other APs via WiFi, a wired communication network, etc.), where the one or more communications indicate that transmissions in the wireless network are interfering with transmissions of, and/or consuming wireless medium time of, the one or more other wireless communication networks. In response to such communications, the communication device may determine that that the one or more transmission modes that provide longer transmission ranges should not be used in the wireless communication network.

In various embodiments, the one or more transmission modes defined by the wireless communication protocol that provide longer transmission ranges (e.g., as compared to other transmission modes defined by the wireless communication protocol) include one of, or any suitable combination of two or more of: an extended range PPDU format (such as the extended range SU PPDU format described above), one or more modulation schemes (e.g., BPSK, QAM, etc.), one or more MCSs, one or more modulation schemes for a particular number of spatial streams, one or more modulation schemes for a particular frequency bandwidth, one or more MCSs for a particular number of spatial streams, one or more MCSs for a particular frequency bandwidth, DCM, etc.

Additionally, the communication device in the wireless communication network (e.g., the AP) informs one or more other communication devices in the wireless communication network that the one or more transmission modes are not to be used in the wireless communication network, according to an embodiment. For example, in an embodiment, the communication device (e.g., the AP) includes in a communication frame information that indicates a particular transmission mode is not to be used in the wireless communication network, and transmits the communication frame to the one or more other communication devices in the wireless communication network. In an embodiment, the communication device (e.g., the AP) generates the communication frame to include an information element that provides operation information for the wireless communication network (e.g., a network operation information element, a high efficiency WiFi (HE) operation element, etc.), where the information element includes one or more subfields for indicating whether one or more transmission modes defined by the wireless communication protocol that provide longer transmission ranges are permitted in the wireless communication network (e.g., one or more of: a subfield that indicates whether use of an extended range PPDU format is permitted, a subfield that indicates whether use of DCM is permitted, a subfield that indicates whether use of one or more MCSs is permitted, etc.). In such embodiments, the communication device (e.g., the AP) sets the one or more subfields to indicate that the one or more transmission modes are not permitted (e.g., one or more of use of the extended range PPDU format is not permitted, a use of DCM is not permitted, use of one or more MCSs is not permitted, etc.).

In an embodiment, indicating that MCS0 is not permitted informs the communication devices that DCM for MCS0 and MCS1 is also not permitted. In an embodiment, indicating that MCS0 and MCS1 are not permitted informs the communication devices that DCM for MCS0, MCS1, and MCS2 are also not permitted. In an embodiment, indicating that MCSi is not permitted (where i is zero or a positive integer) informs the communication devices that DCM for MCS0 and MCS1 is also not permitted. In an embodiment in which the communication protocol specifies that DCM is only permitted to be used with MCS0, MCS1, MCS3, and MCS4, indicating that at least MCS0, MCS1, and MCS3 are not permitted informs the communication devices that DCM is not permitted at all.

In another embodiment, the communication device (e.g., the AP) generates the communication frame to include an information element that provides capability information of the communication device (e.g., a network capabilities information element, a high throughput WiFi (HT) capabilities element, etc.), where the information element includes a bitmask subfield for indicating which MCS/number of spatial streams (Nss) combinations are supported by the communication device. In such embodiments, the communication device (e.g., the AP) sets the bitmask to indicate which one or more MCS/Nss combinations are not permitted.

In another embodiment, the communication device (e.g., the AP) generates the communication frame to include an information element that provides capability information of the communication device (e.g., a network capabilities information element, a high throughput WiFi (HT) capabilities element, etc.), where the information element includes a bitmask subfield for indicating which MCS/Nss/frequency bandwidth combinations are supported by the communication device. In such embodiments, the communication device (e.g., the AP) sets the bitmask to indicate which one or more MCS/Nss/frequency bandwidth combinations are not permitted.

In some embodiments, the communication frame is a MAC data unit (e.g., an MPDU, an MSDU, etc.). In some embodiments, the communication frame is a MAC control frame defined by the wireless communication protocol. In some embodiments, the communication frame is a MAC management frame defined by the wireless communication protocol. In various embodiments, the communication frame is a beacon frame, an association request frame, an association response frame, a reassociation request frame, a reassociation response frame, a probe request frame, a probe response frame, a mesh peering open frame, a mesh peering close frame, etc.

In some embodiments, the communication frame is included in a PPDU for wireless transmission. In some embodiments, the PPDU has a format such as illustrated in FIG. 2A. In some embodiments, the PPDU has a format such as illustrated in FIG. 2B. In other embodiments, the PPDU has another suitable format.

In some embodiments, the communication frame instructs one or more other communication devices that the one or more transmission modes should not be used for transmission of MAC control frames and/or MAC management frames. In some embodiments, the communication frame instructs one or more other communication devices that the one or more transmission modes should not be used for transmission of data frames. In some embodiments, the communication frame instructs one or more other communication devices that the one or more transmission modes should not be used for transmission of any type of communication frame.

FIG. 3 is a flow diagram of an example method 300 for instructing one or more communication devices in a wireless communication network to not use one or more first transmission modes defined by a communication protocol in order to limit range of transmissions in the wireless communication network, according to an embodiment. In some embodiments, the one or more first transmission modes provide extended range communications as compared to one or second protocol transmission modes defined by the communication protocol.

In some embodiments, the method 300 is implemented by a communication device that manages a wireless communication network (e.g., an AP). In other embodiments, the method 300 is implemented by a communication device in a peer-to-peer network, a mesh network, etc. In an embodiment, the network interface device 122 of FIG. 1 is configured to implement the method 300. The method 300 is described, however, in the context of the network interface device 122 merely for explanatory purposes and, in other embodiments, the method 300 is implemented by another suitable device.

At block 304, a communication device (e.g., the network interface device 122) generates a communication frame that includes information indicating that the one or more first transmission modes should not be used when transmitting in the communication network.

In an embodiment, the communication protocol defines a plurality of PPDU formats including an extended range PPDU format for providing extended range communications, and the one or more first transmission modes includes the extended range PPDU format.

In an embodiment, the communication protocol defines a DCM mode, and the one or more first transmission modes includes the DCM mode.

In an embodiment, the communication protocol defines a plurality of MCSs corresponding to different data rates, and the one or more first transmission modes includes one or more first MCSs that i) correspond to one or more lower data rates, and ii) facilitate longer range communications, as compared to one or more second MCSs in the plurality of MCSs.

In an embodiment, the information indicating that the one or more first transmission modes should not be used when transmitting in the communication network indicates that the one or more first transmission modes should not be used when transmitting MAC control frames and/or MAC management frames in the communication network. In an embodiment, the information indicating that the one or more first transmission modes should not be used when transmitting in the communication network indicates that the one or more first transmission modes should not be used when transmitting data frames in the communication network. In an embodiment, the information indicating that the one or more first transmission modes should not be used when transmitting in the communication network indicates that the one or more first transmission modes should not be used when transmitting any type of communication frame in the communication network.

In an embodiment, the one or more first transmission modes include one or more first PHY protocol transmission modes, and the one or more second transmission modes include one or more second PHY protocol transmission modes.

In an embodiment, at least one transmission mode of the one or more first transmission modes is defined by the communication protocol to be a mandatory transmission mode.

At block 308, the communication device transmits the communication frame to instruct one or more other communication devices in the wireless communication network to not use the one or more first transmission modes when transmitting in the wireless communication network.

In an embodiment, the communication frame is MAC protocol data unit, and the method further includes generating a PPDU that includes the MAC protocol data unit. In an embodiment, transmitting the communication frame at block 308 includes transmitting the PPDU. In an embodiment, the MAC processing unit 126 generates the MAC protocol data unit and provides the MAC protocol data unit to the PHY processing unit 130; the PHY processing unit 130 generates the PPDU to include the MAC protocol data unit and generates one or more transmission signals corresponding to the PPDU, the one or more transmission signals for transmission via the one or more antennas 138.

FIG. 4 is a flow diagram of an example method 400 for communicating in a wireless communication network in response to receiving an instruction to not use one or more first transmission modes defined by a communication protocol, according to an embodiment. In some embodiments, the one or more first transmission modes provide extended range communications as compared to one or second protocol transmission modes defined by the communication protocol.

In an embodiment, the network interface device 162 of FIG. 1 is configured to implement the method 400. The method 400 is described, however, in the context of the network interface device 162 merely for explanatory purposes and, in other embodiments, the method 400 is implemented by another suitable device.

At block 404, a first communication device (e.g., the network interface device 162) receives a communication frame from a second communication device (e.g., the AP 114, another client station 154, etc.) that includes information indicating that the one or more first transmission modes should not be used when transmitting in the communication network.

In an embodiment, the communication protocol defines a plurality of PPDU formats including an extended range PPDU format for providing extended range communications, and the one or more first transmission modes includes the extended range PPDU format.

In an embodiment, the communication protocol defines a DCM mode, and the one or more first transmission modes includes the DCM mode.

In an embodiment, the communication protocol defines a plurality of MCSs corresponding to different data rates, and the one or more first transmission modes includes one or more first MCSs that i) correspond to one or more lower data rates, and ii) facilitate longer range communications, as compared to one or more second MCSs in the plurality of MCSs.

In an embodiment, the information indicating that the one or more first transmission modes should not be used when transmitting in the communication network indicates that the one or more first transmission modes should not be used when transmitting MAC control frames and/or MAC management frames in the communication network. In an embodiment, the information indicating that the one or more first transmission modes should not be used when transmitting in the communication network indicates that the one or more first transmission modes should not be used when transmitting data frames in the communication network. In an embodiment, the information indicating that the one or more first transmission modes should not be used when transmitting in the communication network indicates that the one or more first transmission modes should not be used when transmitting any type of communication frame in the communication network.

In an embodiment, the one or more first transmission modes include one or more first PHY protocol transmission modes, and the one or more second transmission modes include one or more second PHY protocol transmission modes.

In an embodiment, at least one transmission mode of the one or more first transmission modes is defined by the communication protocol to be a mandatory transmission mode.

At block 408, the first communication device, in response to receiving the communication frame at block 404, refrains from using the one or more first transmission modes when transmitting in the wireless communication network.

In an embodiment, the communication frame is MAC protocol data unit, and receiving the communication frame at block 404 includes receiving (e.g., the PHY processing unit 170 receives) one or more transmission signals (via the one or more antennas 178) corresponding to a PPDU that includes the MAC protocol data unit. In an embodiment, the method also includes the PHY processing unit 170 processing the PPDU to retrieve the MAC protocol data unit and providing the MAC protocol data unit to the MAC processing unit 166. In an embodiment, the method further comprises the MAC processing unit 166 processing the MAC protocol data unit to determine that the one or more first transmission modes are not to be used when transmitting in the wireless communication network. In an embodiment, block 408 comprises the MAC processing unit 166, in response to determining that the one or more first transmission modes are not to be used, controlling the PHY processing unit 170 so that the one or more first transmission modes are not to be used when transmitting in the wireless communication network.

In some embodiments, the first communication device refrains (block 408) from using a first transmission mode only when transmitting some types of communication frames in the wireless communication network. For example, in some embodiments, the first communication device does not refrain from using a first transmission mode when transmitting certain types of communication frames in the wireless communication network, such as control frames that initiate a transmit opportunity period (TXOP) in which the first communication device gains control over a wireless communication medium during the TXOP. As another example, the first communication device does not refrain from using a first transmission mode when transmitting a control frame that i) is not a block acknowledgment frame or a block acknowledgment request frame, and ii) initiates a TXOP, according to an embodiment.

As yet another example, the first communication device does not refrain from using a first transmission mode when transmitting a response to certain control frames that utilize the first transmission mode, according to some embodiments. For example, if the first communication device has determined that DCM is not to be used, and the first communication device receives a control frame that i) elicits a response frame and ii) was transmitted using DCM, the first communication device transmits the response frame using DCM. As another example, if the first communication device has determined that the extended range PPDU format is not to be used, and the first communication device receives a control frame that i) elicits a response frame and ii) was transmitted using the extended range PPDU format, the first communication device transmits the response frame using the extended range PPDU format.

In various embodiments, a method comprises one of, or any suitable combination of two or more of, the following features.

A method in a wireless communication network that operates according to a communication protocol that defines one or more first transmission modes that provide extended range communications as compared to one or second transmission modes defined by the communication protocol, the method comprising: generating, at a communication device, a communication frame that includes information indicating that the one or more first transmission modes should not be used when transmitting in the wireless communication network; and transmitting, by the communication device, the communication frame to instruct one or more other communication devices in the wireless communication network to not use the one or more first transmission modes when transmitting in the wireless communication network.

The method of claim 1, wherein: the communication protocol defines a plurality of physical layer (PHY) protocol data unit (PPDU) formats including an extended range PPDU format for providing extended range communications; and the one or more first transmission modes comprise the extended range PPDU format.

The method of either of claim 1 or 2, wherein: the communication protocol defines a dual carrier modulation (DCM) mode; and the one or more first transmission modes comprise a dual carrier modulation (DCM) mode.

The method of any of claims 1-3, wherein: the communication protocol defines a plurality of modulation and coding schemes (MCSs) corresponding to different data rates; and the one or more first transmission modes comprise one or more first MCSs that i) correspond to one or more lower data rates, and ii) facilitate longer range communications, as compared to one or more second MCSs in the plurality of MCSs.

The method of any of claims 1-4, wherein: the communication protocol i) defines a plurality of modulation and coding schemes (MCSs), and ii) permits the use of different numbers of spatial streams; and the one or more first transmission modes comprise one or more sets of MCS/number of spatial stream combinations, wherein one or more first MCSs in the MCS/number of spatial stream combinations of the one or more first transmission modes correspond to i) to one or more lower data rates, and ii) facilitate longer range communications, as compared to one or more second MCSs in the plurality of MCSs, for a given number of spatial streams.

The method of any of claims 1-5, wherein: the information indicating that the one or more first transmission modes should not be used when transmitting in the communication network indicates that the one or more first transmission modes should not be used when transmitting at least some media access control layer (MAC) control frames and/or MAC management frames in the communication network.

The method of any of claims 1-5, wherein: the information indicating that the one or more first transmission modes should not be used when transmitting in the communication network indicates that the one or more first transmission modes should not be used when transmitting data frames in the communication network.

The method of any of claims 1-7, wherein: the communication frame is a media access control layer (MAC) protocol data unit; the method further comprise generating, at the communication device, a physical layer (PHY) protocol data unit PPDU that includes the MAC protocol data unit; and transmitting the communication frame includes transmitting the PPDU.

The method of any of claims 1-8, wherein: the one or more first transmission modes include one or more first physical layer (PHY) protocol transmission modes; and the one or more second transmission modes include one or more second PHY protocol transmission modes.

In other various embodiments, an apparatus comprises one of, or any suitable combination of two or more of, the following features.

An apparatus, comprising: a network interface device associated with a communication device, wherein the network interface device includes one or more integrated circuits (ICs) configured to: generate a communication frame that includes information indicating that one or more first transmission modes should not be used when transmitting in a wireless communication network, wherein the wireless communication network operates according to a communication protocol that defines the one or more first transmission modes and one or second transmission modes, wherein the one or more first transmission modes provide extended range communications as compared to the one or second transmission modes; wherein the one or more ICs are further configured to transmit the communication frame to instruct one or more other communication devices in the wireless communication network to not use the one or more first transmission modes when transmitting in the wireless communication network.

The apparatus of claim 10, wherein: the communication protocol defines a plurality of physical layer (PHY) protocol data unit (PPDU) formats including an extended range PPDU format for providing extended range communications; and the one or more first transmission modes comprise the extended range PPDU format.

The apparatus of either of claim 10 or 11, wherein: the communication protocol defines a dual carrier modulation (DCM) mode; and the one or more first transmission modes comprise a dual carrier modulation (DCM) mode.

The apparatus of any of claims 10-12, wherein: the communication protocol defines a plurality of modulation and coding schemes (MCSs) corresponding to different data rates; and the one or more first transmission modes comprise one or more first MCSs that i) correspond to one or more lower data rates, and ii) facilitate longer range communications, as compared to one or more second MCSs in the plurality of MCSs.

The apparatus of any of claims 10-13, wherein: the communication protocol i) defines a plurality of modulation and coding schemes (MCSs), and ii) permits the use of different numbers of spatial streams; and the one or more first transmission modes comprise one or more sets of MCS/number of spatial stream combinations, wherein one or more first MCSs in the MCS/number of spatial stream combinations of the one or more first transmission modes correspond to i) to one or more lower data rates, and ii) facilitate longer range communications, as compared to one or more second MCSs in the plurality of MCSs, for a given number of spatial streams.

The apparatus of any of claims 10-14, wherein: the information indicating that the one or more first transmission modes should not be used when transmitting in the communication network indicates that the one or more first transmission modes should not be used when transmitting at least some media access control layer (MAC) control frames and/or MAC management frames in the communication network.

The apparatus of any of claims 10-14, wherein: the information indicating that the one or more first transmission modes should not be used when transmitting in the communication network indicates that the one or more first transmission modes should not be used when transmitting data frames in the communication network.

The apparatus of any of claims 10-16, wherein: the communication frame is a media access control layer (MAC) protocol data unit; and the one or more ICs are further configured to: generate a physical layer (PHY) protocol data unit PPDU that includes the MAC protocol data unit, and transmit the PPDU.

The apparatus of any of claims 10-17, wherein: the one or more first transmission modes include one or more first physical layer (PHY) protocol transmission modes; and the one or more second transmission modes include one or more second PHY protocol transmission modes.

The apparatus of any of claims 10-18, wherein the network interface device comprises: a physical layer (PHY) processor implemented on the one or more IC devices; and a medium access control (MAC) processor coupled to the PHY processor and implemented on the one or more IC devices.

The apparatus of claim 19, wherein the PHY processor comprises: one or more transceivers.

The apparatus of claim 20, further comprising: one or more antennas coupled to the one or more transceivers.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method in a wireless communication network that operates according to a communication protocol that defines a plurality of physical layer (PHY) protocol data unit (PPDU) formats including an extended range PPDU format for providing extended range communications as compared to one or more other PPDU formats among the plurality of PPDU formats defined by the communication protocol, the method comprising:

determining, at an access point (AP) of the wireless communication network, that spatial reuse of a communication channel by one or more other wireless communication networks is to be supported;

in response to the AP determining that spatial reuse of the communication channel by one or more other wireless communication networks is to be supported, generating, at the AP, a frame that includes, within a high efficiency (HE) operation element, information indicating that any client stations that operate according to the communication protocol and that are in communication with the AP cannot transmit packets having the extended range PPDU format in the communication channel; and transmitting, by the AP, the frame to instruct the any client stations to not transmit packets having the extended range PPDU format to the AP to facilitate spatial reuse of the communication channel by one or more other wireless communication networks.

2. The method of claim 1, wherein:

the communication protocol defines a dual carrier modulation (DCM) mode;

generating the frame in response to the AP determining that spatial reuse is to be supported comprises generating the frame to include information indicating that the any client stations cannot transmit packets using the DCM mode; and transmitting the frame instructs the any client stations to not use the DCM mode causing a reduction of a range of transmissions by the any client stations as compared to when the any client stations use the DCM mode.

3. The method of claim 1, wherein:
the communication protocol defines a plurality of modulation and coding schemes (MCSs) corresponding to different data rates;
the plurality of MCSs comprises one or more first MCSs and one or more second MCSs;
the one or more first MCSs i) correspond to one or more lower data rates, and ii) facilitate longer range communications, as compared to the one or more second MCSs in the plurality of MCSs;
generating the frame in response to the AP determining that spatial reuse is to be supported comprises generating the frame to include information indicating that the any client stations cannot transmit packets using the one or more first MCSs; and
transmitting the frame instructs the any client stations to not use the one or more first MCSs causing a reduction of a range of transmissions by the any client stations as compared to when the any client stations use the one or more second MCSs.

4. The method of claim 1, wherein:
the communication protocol i) defines a plurality of modulation and coding schemes (MCSs), and ii) permits the use of different numbers of spatial streams;
one or more first MCSs in one or more sets of MCS/number of spatial stream combinations correspond to i) to one or more lower data rates, and ii) facilitate longer range communications, as compared to one or more second MCSs in the plurality of MCSs, for a given number of spatial streams;
generating the frame in response to the AP determining that spatial reuse is to be supported comprises generating the frame to include information indicating that the any client stations cannot transmit packets using the one or more sets of MCS/number of spatial stream combinations; and
transmitting the frame instructs the any client stations to not use the one or more sets of MCS/number of spatial stream combinations causing a reduction in a range of transmissions by the any client stations as compared to when the any client stations use the one or more second MCSs.

5. The method of claim 1, wherein:
the information indicating that the one or more first transmission modes should not be used by the any client stations indicates that the one or more first transmission modes should not be used by the any client stations when transmitting data frames to the AP.

6. The method of claim 1, wherein:
the method further comprises generating, at the AP, a physical layer (PHY) protocol data unit PPDU that includes the frame; and
transmitting the frame includes transmitting the PPDU.

7. The method of claim 1, wherein:
the one or more first transmission modes include one or more first physical layer (PHY) protocol transmission modes;
the one or more second transmission modes include one or more second PHY protocol transmission modes; and
transmitting the frame to instruct the any client stations to not use the one or more first PHY protocol transmission modes reduces a range of transmissions by the any client stations as compared to when the any client stations use the one or more second PHY protocol transmission modes.

8. An apparatus, comprising:
a network interface device associated with an access point (AP) of a wireless communication network that operates according to a communication protocol that defines a plurality of physical layer (PHY) protocol data unit (PPDU) formats including an extended range PPDU format for providing extended range communications as compared to the one or more other PPDU formats among the plurality of PPDU formats defined by the communication protocol, and wherein the network interface device includes one or more integrated circuits (ICs) configured to:
determine that spatial reuse of a communication channel by one or more other wireless communication networks is to be supported, and
in response to determining that spatial reuse of a communication channel by one or more other wireless communication networks is to be supported, generate a frame that includes, within a high efficiency (HE) operation element, information indicating that any client stations that are in communication with the AP and that operate according to the communication protocol cannot transmit packets having the extended range PPDU format in the communication channel;
wherein the one or more ICs are further configured to transmit the frame to instruct the any client stations to not transmit packets having the extended range PPDU format to the AP to facilitate spatial reuse of the communication channel by one or more other wireless communication networks.

9. The apparatus of claim 8, wherein:
the communication protocol defines a dual carrier modulation (DCM) mode; and
the one or more ICs are further configured to:
generate the frame to include information indicating that the any client stations cannot transmit packets using the DCM mode, and
reduce a range of transmissions by the any client stations as compared to when the any client stations use the DCM mode by transmitting the frame to instruct the any client stations to not use the DCM mode.

10. The apparatus of claim 8, wherein:
the communication protocol defines a plurality of modulation and coding schemes (MCSs) corresponding to different data rates;
the plurality of MCSs comprises one or more first MCSs and one or more second MCSs;
the one or more first MCSs i) correspond to one or more lower data rates, and ii) facilitate longer range communications, as compared to the one or more second MCSs in the plurality of MCSs; and
the one or more ICs are further configured to:
generating the frame to include information indicating that the any client stations cannot transmit packets using the one or more first MCSs, and
reduce a range of transmissions by the any client stations as compared to when the any client stations use the one or more second MCSs by transmitting the frame to instruct the any client stations to not use the one or more first MCSs.

11. The apparatus of claim 8, wherein:

the communication protocol i) defines a plurality of modulation and coding schemes (MCSs), and ii) permits the use of different numbers of spatial streams;

one or more first MCSs in one or more sets of MCS/number of spatial stream combinations correspond to i) to one or more lower data rates, and ii) facilitate longer range communications, as compared to one or more second MCSs in the plurality of MCSs, for a given number of spatial streams; and the one or more ICs are further configured to:

generate the frame to include information indicating that the any client stations cannot transmit packets using the one or more sets of MCS/number of spatial stream combinations, and reduce a range of transmissions by the any client stations as compared to when the any client stations use the one or more second MCSs by transmitting the frame to instruct the any client stations to not use the one or more sets of MCS/number of spatial stream combinations.

12. The apparatus of claim 8, wherein:

the information indicating that the one or more first transmission modes should not be used when transmitting to the AP indicates that the one or more first transmission modes should not be used when transmitting data frames to the AP.

13. The apparatus of claim 8, wherein:

the one or more ICs are further configured to:

generate a physical layer (PHY) protocol data unit PPDU that includes the frame, and transmit the PPDU.

14. The apparatus of claim 8, wherein the network interface device comprises:

a physical layer (PHY) processor implemented on the one or more IC devices, the PHY processor configured to transmit the frame in a physical layer (PHY) protocol data unit PPDU; and a medium access control (MAC) processor coupled to the PHY processor and implemented on the one or more IC devices, the MAC processor configured to generate the frame in response to the AP determining that spatial reuse is to be supported.

15. The apparatus of claim 14, wherein the PHY processor comprises:

one or more transceivers.

16. The apparatus of claim 15, further comprising:

one or more antennas coupled to the one or more transceivers.

* * * * *